United States Patent
Kabir et al.

(10) Patent No.: US 11,572,176 B2
(45) Date of Patent: Feb. 7, 2023

(54) CRITICAL SEAT SELECTION AND VALIDATION

(71) Applicant: The Boeing Company, Chicago, IL (US)

(72) Inventors: Mohammed Humayun Kabir, Seattle, WA (US); Gagandeep Inder Singh Grewal, Bothell, WA (US); Alan Douglas Byar, Issaquah, WA (US); Mihira Ghatuparthi, Bothell, WA (US); Madhava S. Kulkarni, Redmond, WA (US); Todd Clayton DePauw, Mukilteo, WA (US); Jan Manuelle León Gil, Wheaton, MD (US)

(73) Assignee: The Boeing Company, Chicago, IL (US)

( * ) Notice: Subject to any disclaimer, the term of this patent is extended or adjusted under 35 U.S.C. 154(b) by 454 days.

(21) Appl. No.: 16/718,971

(22) Filed: Dec. 18, 2019

(65) Prior Publication Data
US 2021/0188443 A1 Jun. 24, 2021

(51) Int. Cl.
*B64D 11/06* (2006.01)
*G06F 30/23* (2020.01)
*G06F 30/15* (2020.01)
*B64F 5/00* (2017.01)
*G06F 113/28* (2020.01)
(Continued)

(52) U.S. Cl.
CPC ...... *B64D 11/0619* (2014.12); *B64D 11/0648* (2014.12); *B64F 5/00* (2013.01); *G06F 30/15* (2020.01); *G06F 30/23* (2020.01); *G06T 17/20* (2013.01); *G06T 19/00* (2013.01); *B64D 11/0602* (2014.12); *B64D 11/06205* (2014.12); *G06F 2113/28* (2020.01)

(58) Field of Classification Search
CPC ............ B64D 11/0619; B64D 11/0648; B64D 11/0602; B64D 11/06205; G06F 30/15; G06F 30/23; G06F 2113/28; B64F 5/00; G06T 17/20; G06T 19/00
See application file for complete search history.

(56) References Cited

U.S. PATENT DOCUMENTS

| | | | |
|---|---|---|---|
| 7,194,391 B2 * | 3/2007 | Conchi .................. | G06F 30/15 703/8 |
| 7,715,994 B1 * | 5/2010 | Richards ............. | G01M 5/0041 702/42 |

(Continued)

OTHER PUBLICATIONS

Byar, Alan "A Crashworthiness Study of a Boeing 737 Fuselage Section" Thesis, Drexel U. (2003) (Year: 2003).*

(Continued)

*Primary Examiner* — Jay Hann
(74) *Attorney, Agent, or Firm* — Yee & Associates, P.C.

(57) ABSTRACT

A method of assessing performance of a seat is provided. The method comprises identifying a number of critical seats for testing from a layout of passenger accommodation and building a computer simulation model, following a building block approach, for each identified critical seat. A number of loads are tested on each simulation model. Critical seats are selected for physical testing from simulation model test results according to a specified criteria assessment matrix.

44 Claims, 13 Drawing Sheets

(51) Int. Cl.
*G06T 19/00* (2011.01)
*G06T 17/20* (2006.01)

(56) References Cited

U.S. PATENT DOCUMENTS

| | | | | |
|---|---|---|---|---|
| 8,392,162 | B2* | 3/2013 | Wu | G06F 30/15 703/2 |
| 8,407,033 | B2* | 3/2013 | Cooper | G06F 30/15 703/1 |
| 11,244,088 | B2* | 2/2022 | Shah | G06F 30/15 |
| 2006/0095235 | A1* | 5/2006 | Furtado | G06F 30/15 703/1 |
| 2014/0027574 | A1 | 1/2014 | Obadia et al. | |

OTHER PUBLICATIONS

Vassilakos, G., et al. "Orion Crew Module Landing System Simulation and Verification" IEEE Aerospace Conf. (2011) available from <https://ieeexplore.ieee.org/document/5747623> (Year: 2011).*

Xiaochuan, L., et al. "Crash Simulation and Drop Test of Civil Airplane Fuselage Section" IEEE Int'l Conf. on Mechatronic Sciences Electric Engineering & Computer, pp. 3017-3021 (2013) (Year: 2013).*

* cited by examiner

CRITICAL TEST ARTICLE CRITERIA ASSESSMENT MATRIX

| CRITERIA | LOAD CASE | TEST CASE 1 | TEST CASE 2 | TEST CASE 3 | TEST CASE 4 | TEST CASE 5 | TEST CASE 1 | TEST CASE 2 | TEST CASE 3 | TEST CASE 4 | TEST CASE 5 | TEST CASE 1 | TEST CASE 2 |
|---|---|---|---|---|---|---|---|---|---|---|---|---|---|
| | | | | 16G | | | | | 14G | | | HIC | |
| STRUCTURAL | FLOOR REACTION LOADS | | | | | | | | | | | | |
| | SEATBELT ATTACHMENT LOADS | | | | | | | | | | | | |
| | STRUCTURAL DEFORMATION | | | | | | | | | | | | |
| | CRITICAL STRAINS EVALUATION | | | | | | | | | | | | |
| | CRITICAL STRESSES EVALUATION (VON MISES) | | | | | | | | | | | | |
| | SHEAR STRESS EVALUATION (TRACK FITTING INTERFACE) | | | | | | | | | | | | |
| OCCUPANT SAFETY | HEAD PATH EVALUATION | | | | | | | | | | | | |
| | HEAD ACCELERATIONS, DISPLACEMENT AND VELOCITY | | | | | | | | | | | | |
| | HEAD INJURY CRITERIA (HIC) | | | | | | | | | | | | |
| | NECK INJURY CRITERIA (NIC) (OBLIQUE ONLY) | | | | | | | | | | | | |
| | LUMBAR FORCES | | | | | | | | | | | | |
| | PELVIC ACCELERATION | | | | | | | | | | | | |
| | FEMUR LOADS | | | | | | | | | | | | |

CRITICAL SEAT SELECTION AND VALIDATION

BACKGROUND INFORMATION

1. Field

The present disclosure relates generally to aircraft seating, more specifically, to assessing a performance of a seat design using simulation.

2. Background

Critical seats and unique installations need to be tested to demonstrate those seats meet performance requirements according to current best practices. The conventional process for critical seat selection for dynamic evaluation testing includes performing engineering drawing review, rigid body interface load calculations, and beam bending analysis.

Seat suppliers often evaluate seat performance via physical tests, as defined by technical specifications (e.g., Technical Standards Organization or TSO). The current TSO requires physical testing of new and significantly modified seat designs.

The current development process is to develop seat designs using the available best practices and experiences to meet or exceed the desired seat performance and TSO, or other regulations and standards.

Therefore, it would be desirable to have a method and apparatus that take into account at least some of the issues discussed above, as well as other possible issues.

SUMMARY

An illustrative embodiment of the present disclosure provides a method of assessing performance of a seat. The method comprises identifying a number of critical seats for testing from a layout of passenger accommodation and building a computer simulation model, following a building block approach, for each identified critical seat. A number of loads are tested on each simulation model. Critical seats are selected for physical testing from simulation model test results according to a specified criteria assessment matrix.

Another illustrative embodiment provides a system for assessing performance of a seat. The system comprises a storage device configured to store program instructions and one or more processors operably connected to the storage device and configured to execute the program instructions to cause the system to: identify a number of critical seats designated for testing from a layout of passenger accommodation; build a computer simulation model, following a building block approach, for each identified critical seat; test a number of loads on each simulation model; and select critical seats for physical testing from simulation model test results according to a specified criteria assessment matrix.

Another illustrative embodiment provides a computer program product for seat certification for aircraft under emergency landing dynamic loading conditions. The computer program product comprising a non-volatile computer readable storage medium having program instructions embodied therewith, the program instructions executable by a number of processors to cause a number of processors to perform the steps of: identifying a number of critical seats designated for testing from a layout of passenger accommodation; building a computer simulation model, following a building block approach, for each identified critical seat; testing a number of loads on each simulation model; and selecting critical seats for physical testing from simulation model test results according to a specified criteria assessment matrix.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 10 illustrates an example assessment matrix for critical seat dynamic simulation in accordance with an illustrative embodiment;

DETAILED DESCRIPTION

The illustrative embodiments recognize and take into account one or more different considerations. The illustrative embodiments recognize and take into account that the conventional process for critical seat selection is time intensive and costly.

The illustrative embodiments also recognize and take into account that the current process is to develop seat designs using available best practices and experiences with no explicit information on the performance of the seat. Because of the limited information, some areas of the seats are overdesigned in order to improve probability of test success. After the design is near completion and physical prototypes can be manufactured for testing, it is very expensive to go back to make changes to the design, manufacture new test articles, and retest.

The illustrative embodiments also recognize and take into account that a risk of physical testing is that an evaluation test will fail in a later stage of the program, which will directly impact the aircraft delivery schedule.

The illustrative embodiments also recognize and take into account that using dynamic simulation for product development may not have the level of consistency (e.g. degree of fidelity that is required in the finite element model) for seat evaluation by analysis.

The illustrative embodiments provide a dynamic simulation methodology and process that utilize dynamic simulation as a means of, for example, compliance for evaluation by analysis. The illustrative embodiments integrate building block verification and validation along with modeling and analysis quality assurance checklists to develop a high-fidelity computer simulation model with consistent and accurate results. These methods can be used to develop evaluation seat configurations and use criteria assessment metrics to select the most critical seats for evaluation testing from all of the seat families identified from a layout of passenger accommodation (LOPA) configuration.

Testing and validation are performed on the identified critical seats with a computer simulation model. The remaining seats will be able to be verified by dynamic simulation without need for physical testing. The illustrative embodiments may reduce the number of physical tests, e.g., validation, verification, or certification tests, such as those needed for 14 g and 16 g load conditions, while improving first pass design quality, predictability, and test performance.

The critical seat selection and dynamic simulation of the illustrative embodiments improve physical test efficiency by providing final seat designs with confidence in passing tests and reducing the need to conduct multiple test and design correction cycles. This has the benefit if improving seat development flow and costs, mitigating risk and enhancing delivery discipline.

Figure 1:
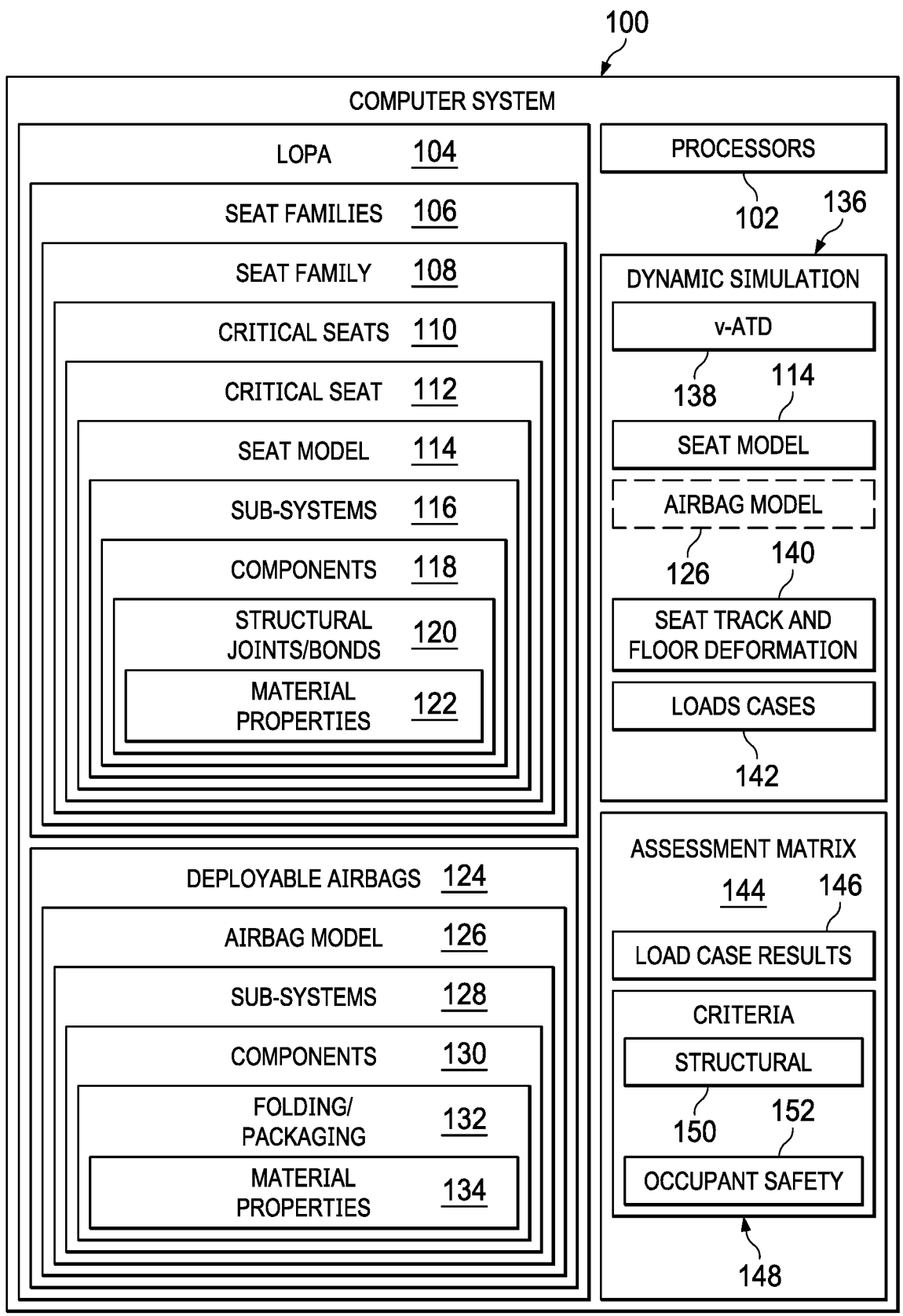
FIG. 1 illustrates a block diagram of a computer system for selecting and simulating critical seats for physical testing in accordance with an illustrative embodiment.

Turning now to FIG. 1, an illustration of a block diagram of a computer system for selecting and simulating critical seats for physical testing is shown in accordance with an illustrative embodiment. Computer system 100 is a physical hardware system and includes one or more data processing systems. When more than one data processing system is present in computer system 100, those data processing systems are in communication with each other using a communications medium. The communications medium can be a network.

Computer system 100 comprises data for LOPA 104, which is a schematic of the interior design of an aircraft including, e.g., locations of passenger and crew seating, lavatories, exits, galleys, emergency equipment, etc. Within LOPA 104, computer system 100 identifies a number of seat families 106 that comprise common or equivalent components in a primary load path.

Within each seat family 108 the computer system 100 identifies a number of critical seats 110. Critical seats are the seats within the family that are potentially subject to the greater loads than other seats. The critical seats within a family are able to withstand certain simulated loading forces, and as such the other family members will withstand the simulated loading forces.

For each critical seat 112 with the group of critical seats 110 computer system 100 constructs a computer simulation model of the seat, such as model 114 that can be used to simulate the seat under different load cases 142. Seat model 114 can be a finite element model (FEM). In other embodiments, other model types are contemplated, such as, e.g., a solid rigid body model. Seat model 114 comprises a number of sub-systems 116. The sub-systems 116 in turn comprises a number of components 118. The components 118 comprise structural features including joints/bonds 120 both within a component and between components. Components 118 are made from a number of materials that have properties 122 that are accounted for in seat model 114.

LOPA 104 might also include a number of airbags 124 in specific locations to provide additional protection to passengers. For example, for seats positioned in front of bulkheads/partition or monuments, airbags might be built into the bulkhead.

Computer system 100 can build airbag computer simulation model 126 to simulate the deployment and performance of airbags 124. Similar to seat model 114, airbag model 126 might comprise a number of sub-systems 128. Sub-systems 128 in turn comprise a number of components 130. Airbag model also models the folding/packing 132 of the airbag for deployment and the material properties 134 of the materials used to build the deployable airbag.

Computer system 100 comprises a number of processors 102 that can execute program code to identify the critical seats 110 in LOPA 104 and builds models for the critical seats such as seat model 114 and models for any corresponding deployable airbags such as airbag model 126.

Processors 104 can execute software code to performance dynamic simulation 136 to simulate dynamic loads being applied to the models. Dynamic simulation 136 simulates dynamic performance by using a number of elements. A virtual anthropomorphic testing device (v-ATD) 138 simulates a passenger in a seat. Seat model 114 is included in dynamic simulation 136, and for seats that have corresponding airbags, airbag model 126 might be included in simulation 136 as well.

Since the manner in which a seat absorbs dynamic loads is also influenced by its interface with the aircraft structure. Accordingly, dynamic simulation might also include a model of the seat track and floor deformation 140.

The elements included in dynamic simulation 136 are subjected to a number of specified load/test cases 142. Load cases 142 might include, e.g., loads of about 14 g vertically downward and about 16 g horizontally forward with pitch and roll with respect to the aircraft coordinate system. Pitch and roll refer to floor deformations and are used to create a scenario for the seat to assess its structural integrity.

Results of dynamic simulation 136 might be evaluated in terms of assessment matrix 144. Assessment matrix 144 compares different load case results 146 against a number of criteria 148. Criteria 148 might include structural criteria 150 and occupant safety criteria 152.

Figure 2A:
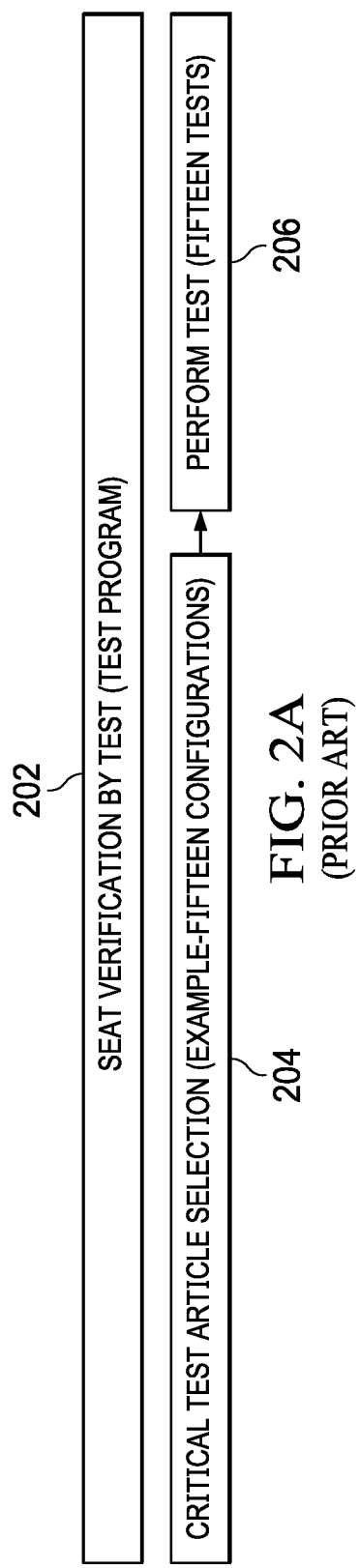
FIG. 2A is a diagram illustrating traditional seat validation in accordance with the prior art.

FIG. 2A is a diagram illustrating traditional seat validation in accordance with the prior art. The typical method of seat verification 202 comprises identifying critical seats for physical testing 204. The selection process 204 is conducted based on regulatory guidelines. Typically, 15 seats are chosen for physical testing.

After the critical seats for testing are chosen, physical tests 206 are performed on the seats. These tests typically comprise sled tests with a physical anthropomorphic testing device (ATD) (i.e. dummy). The test results are collected and documented. With this test procedure, no or very minimal testing is performed for root cause analysis in the event of any test failures.

Figure 2B:
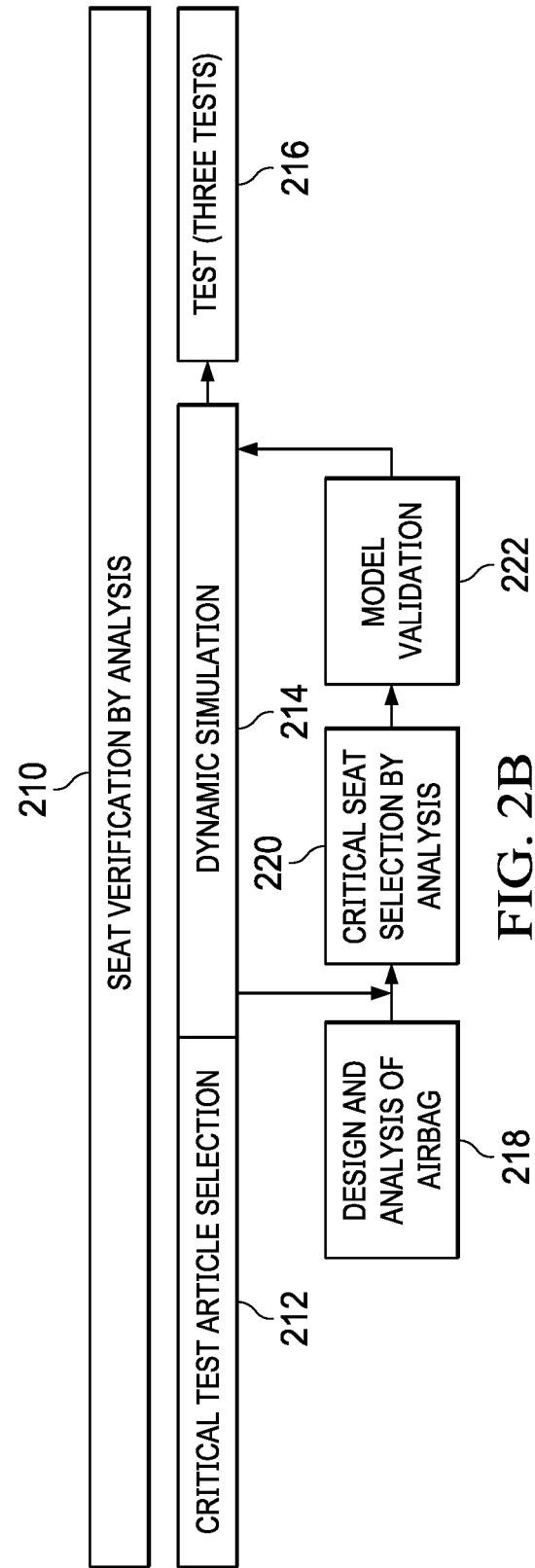
FIG. 2B is a diagram illustrating seat validation by analysis in accordance with an illustrative embodiment.

FIG. 2B is a diagram illustrating seat validation by analysis in accordance with an illustrative embodiment. In contrast to the prior art testing method 202, the verification by analysis method 210 of the illustrative embodiments is able to down-select the number of physical tests that need to be performed.

In verification by analysis 210, critical test article selection 212 is also performed for the LOPA in question. However, dynamic simulation 214 is also used to reduce the number of articles that need to be physically tested. Dynamic simulation 214 allows for the design and analysis of airbags 218, critical seat selection by analysis 220, and evaluation of simulation models 222 before physical testing 216. As a result, physical testing 216 might only comprise, e.g., three required physical tests instead of 15.

Figure 3:
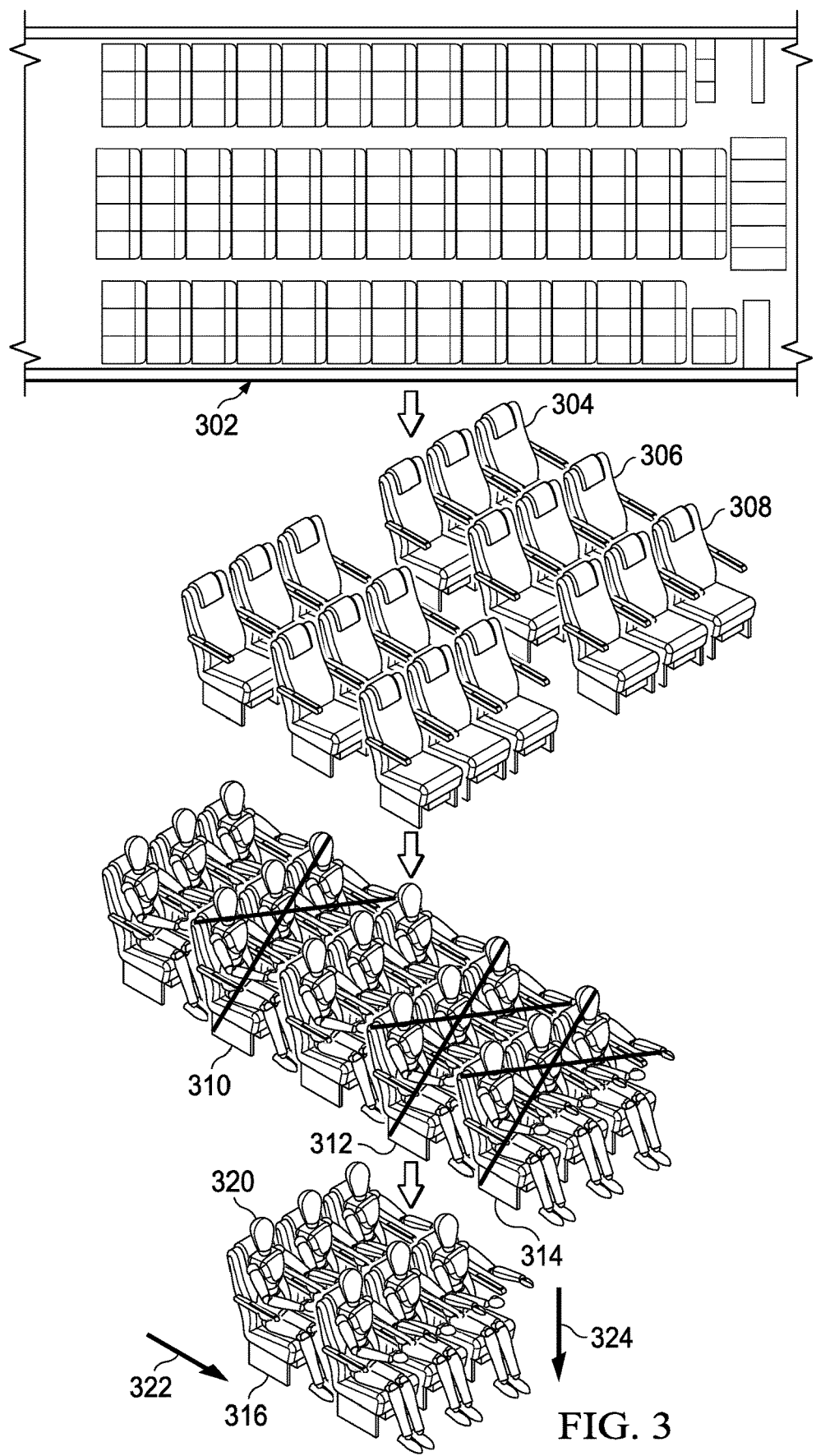
FIG. 3 illustrates critical seat selection in accordance with an illustrative embodiment.

FIG. 3 illustrates critical seat selection in accordance with an illustrative embodiment. For certain verification processes, the appropriate test articles and test conditions are selected. Test article selection represents the critical case condition for the metrics being measured. The most highly stressed configuration (determined statically & by dynamic simulation) is selected for dynamic test. This test article can be used for developing a correlated and validated model of the seat system. This validated model can be used for evaluating other configurations (within the same family) by analysis, in some applications.

Within a given LOPA 302 a number of seat families 304, 306, 308 are identified. Families of seats within a seat design are those that have some minor differences but have identical components in the primary load path. They are based on the same design philosophy, method of construction, manufacturing processes, materials, or geometry. There may be minor differences due to spatial limitations and attachment methods. These differences are typically shown to be equivalent or non-critical with regard to strength, stiffness, and permanent deformation to be considered in the same family.

A primary load path (not shown) describes the components within the seat that carry the load from the point of load application to the structure that reacts the load from the seat system or sub-system. The primary load path varies depending on the parameter being evaluated. For example, if the parameter is structural for forward loading, shown by arrow 322, the primary load path is from seat belt/harness to fittings attaching the seat system to the aircraft structure. If the parameter is structural for downward loading, shown by arrow 324, the primary load path is the seat cushion and seat pan to the legs and to the floor attachments. If the parameter is occupant safety like lumbar load in an ATD/dummy 320, then seat cushion stiffness, seat pan stiffness will influence the lumbar load. If the parameter is row-to-row head injury criteria (HIC), the load path is from point of ATD head contact to the seat back structure of the target seat in front. If the parameter is head path (e.g., front row or large pitch seats), the load path is from seat belt/harness to fittings attaching the seat system to the aircraft structure.

Within each seat family 304, 306, 308 there is a baseline seat, which is the first seat designed and manufactured for a new family. The initial series of tests are performed on the baseline seat as part of the original evaluation to substantiate the seat family.

Within a seat family, symmetric (e.g., right and left variations) and less critical seats, e.g., 310, 213, 314 are identified and eliminated from the list. The remaining seats 316 are used for dynamic simulation.

Figure 4:
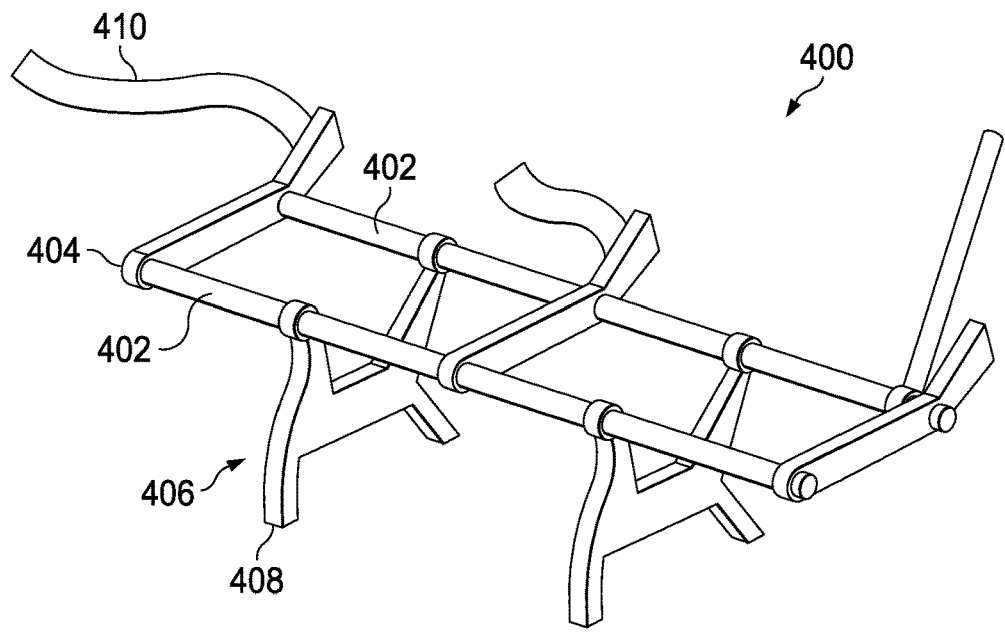
FIG. 4 illustrates a seat frame with which the illustrative embodiments can be implemented.

FIG. 4 illustrates a seat frame with which the illustrative embodiments can be implemented. FIG. 4 depicts a clearer view of seat frame 400 that can form part of critical seats 316 in FIG. 3. Seat frame 400 comprises cross beams 402 and spreaders 404 that hold the seat pan and cushion (not shown). Frame 400 also comprises legs 406 and track fittings 408 that connect the seat frame 400 to the aircraft structure. The passenger restraint system (e.g., seatbelt) 410 is mounted to the seat frame 400.

Figure 5:
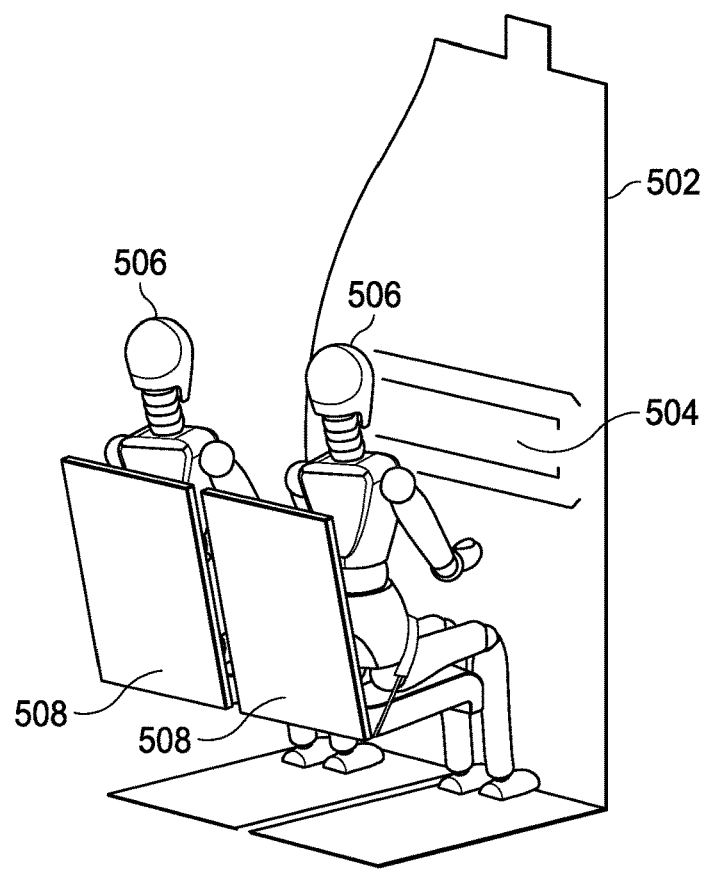
FIG. 5 illustrates a bulkhead with a deployable airbag for front row seats in accordance with an illustrative embodiment.

FIG. 5 illustrates a bulkhead with a deployable airbag for front row seats in accordance with an illustrative embodiment. Some aircraft designs might include deployable airbags in front of seats that are positioned in the LOPA in front of bulkheads or other hard structures within the cabin interior. In the example shown in FIG. 5, seats 508 are positioned in front of bulkhead 502. An undeployed airbag system 504 is build into the bulkhead 502 to protect passengers 506 from impact with the bulkhead. The illustrative embodiment can simulate and evaluate the performance of airbag designs in conjunction with seat simulation and testing.

Figure 6:
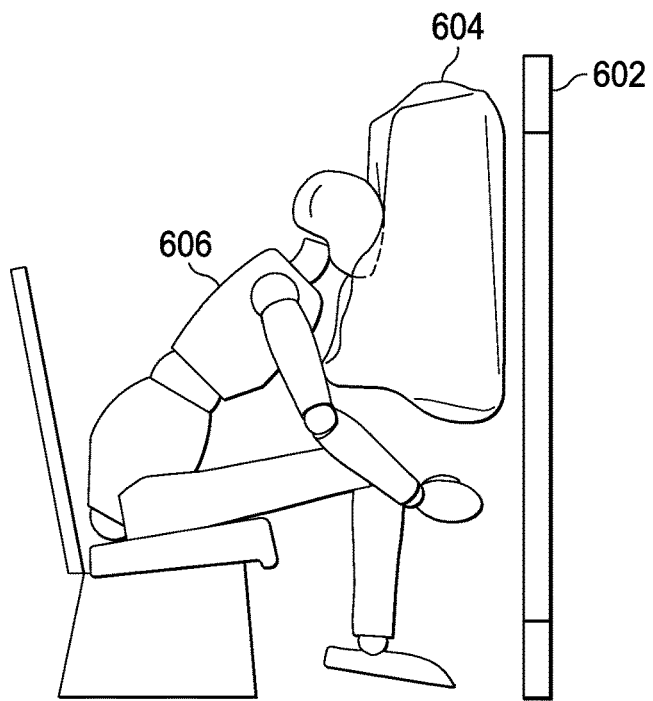
FIG. 6 illustrates a side view of an airbag deployed from a bulkhead in front of a seat in accordance with an illustrative embodiment.

FIG. 6 illustrates a side view of an airbag deployed from a bulkhead in front of a seat in accordance with an illustrative embodiment. In the example, airbag 604 inflates from bulkhead 602 and provides large area coverage of passenger 606 including head, torso, and knees.

Figure 7:
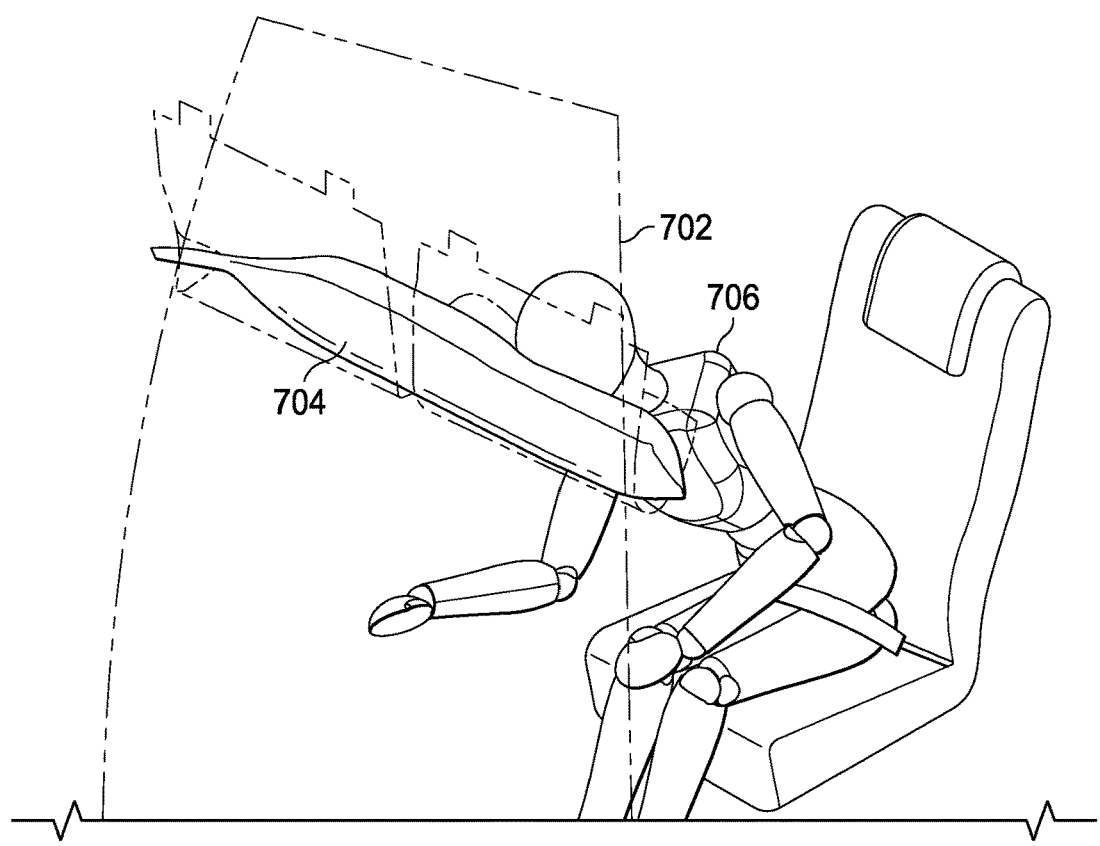
FIG. 7 illustrates a perspective view of a head airbag deployed from a bulkhead in accordance with an illustrative embodiment.

FIG. 7 illustrates a perspective view of a head airbag deployed from a bulkhead in accordance with an illustrative embodiment. In this alternate example, the airbag 704 that deploys from bulkhead 702 is design primarily to provide protection against head impact by the passenger 706.

Figure 8:
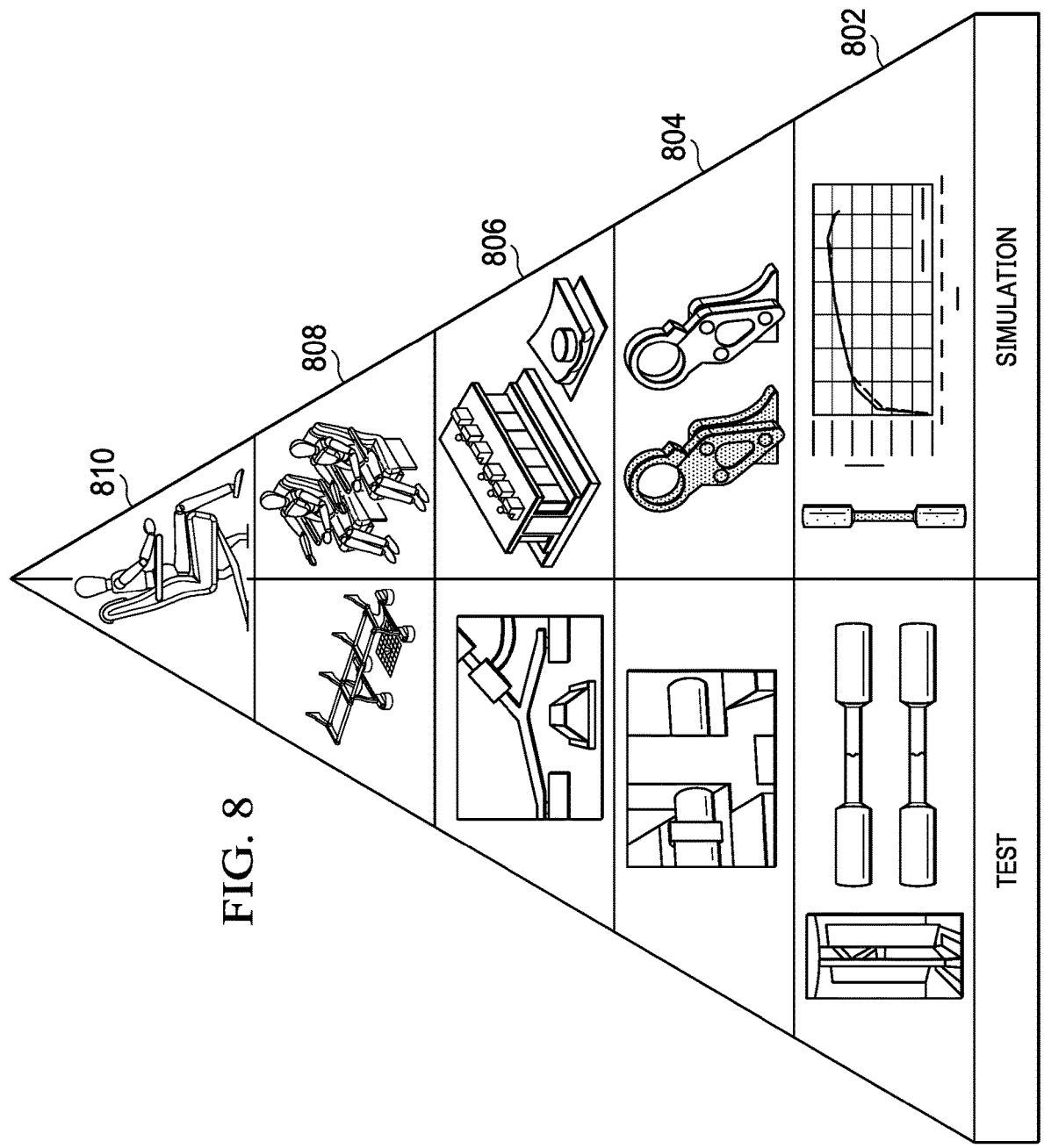
FIG. 8 illustrates a building block approach to building a simulation model of a seat in accordance with an illustrative embodiment.

FIG. 8 illustrates a building block approach to building a simulation model of a seat in accordance with an illustrative embodiment. FIG. 8 is an example of building a model such as seat model 114 in FIG. 1.

The building block approach is a systematic way of performing evaluation of simulation idealizations, from material models all the way to complex seat system assemblies and installations. Using this approach provides the confidence that, when the seat system simulation is run, it will be successfully validated to test data. The building block approach is particularly important when using new materials, failure modes, handling complex structures with little or no standard analysis methods, and accommodating installations that are highly sensitive to dynamic loading.

In a building block approach, at each level of the build process, a feature of the seat is modeled and tested against simulated loads. The simulation results are then evaluated against physical testing of the feature in question to assess the fidelity of the model. Evaluation might comprise, e.g., validation and verification (V&V). Validation and verification are procedures to assess the accuracy of computational simulations and build confidence and credibility in computational simulations.

Verification can comprise code verification directed toward finding and removing mistakes in source code and errors in algorithms and improving software quality. Verification can also comprise calculation verification directed toward assuring the accuracy of input data, estimating numerical solution error, and assuring the accuracy of output data.

Validation is a process for determining the degree to which a model can be represented as accurate in the physical world according to its intended use. Validation assess the ability of the model to represent a physical phenomenon by comparing model predictions to physical test data. Validation metrics define the difference between physical test values and corresponding model/simulation values.

The building block approach begins with material characterization 802. Material characterization coupon testing examines the material selection and ensures that the material strengths, advantages, and disadvantages are well understood in advance of seat design. It is difficult to achieve reliable simulation results for test analysis correlation without high quality material data. Selection of the material model depends on the physical behavior of material, failure mode, damage, and how the component is loaded. Material characterization begins with linear material properties including elastic properties (Young's Modulus, Poisson's Ratio), strength properties (yield strength, ultimate strength, shear, bearing, elongation), and physical properties (density, stress-intensity factor).

A non-linear, stress-strain plasticity curve is used to define the relationship between large displacement and stress due to impact loading. Coupon testing confirms the material data unless it is from Metallic Material Properties Development and Standardization (MMPDS) data sheets or other, documented, proprietary data sources. Regardless of source of material data it should be verified that it is defined correctly in the model. The engineering stress-strain curve are converted to a true stress-strain curve.

Damage and failure parameters are used to predict failure in dynamic simulation models. Strain rate effects, material properties data scatter, anisotropic plasticity, and damage/failure behavior are considered when developing material models. A material model is elected that describes the elastic-plastic behavior of the material and that can define failure parameter along with elastic-plastic properties if appropriate for parts in primary load path.

The model predictions and test results can be evaluated against testing of a physical counterpart. For example, the material characterization may be tested to confirm that the selected material model is reproducing the physics observed in the test. The evaluation can calibrate model parameters, for example, finite element input parameters such as element formulation, element type, time step scale factor, element length, and material model. At the end of each analysis, a system response such as force or displacement is compared with the physical test result at different loading levels. In an illustrative embodiment, coupon level test-analysis target correlation error is about 2% or less. Careful consideration of material behavior is given to seat foam, seatbelt webbing, seat pan, and any other areas where material definition can contribute significantly to characterization of the part.

After material characterization 802, structural joints 804 are modeled in the building block approach. In certain applications, aircraft monuments such as seats allow for structural compliance that use material strength and also material plastic behavior and mechanical joints of components to provide nonlinear resistance during dynamic event. Fasteners joint behavior, in terms of deformation and failure, play a significant role in predicting structural integrity of structure and occupant safety.

For complex mechanical joints, fittings, restraints system, and seat-to-airplane interfaces, detailed structural testing is required to characterize the performance of these joints so that deformation, and potential failure is accurately predicted. When modeling bolted joints as either idealized beam elements or solid elements, they include representation of bolt preload, bearing stresses, and friction. Testing of the joint models is achieved by performing tension and shear tests and correlating key performance characteristics such as load, deformation, or failure to the model. As with the material models, the predictions of the joint models are evaluated against testing of physical counterparts to calibrate model parameters. In an illustrative embodiment, the joint level static analysis target correlation is 5% or less. If rigid constraints are used as a fastener definition between components it needs to be checked to ensure that the rigid constraints are not improperly stiffening the model. It is recommended not to use rigid joints in the primary load path.

The next level in the building block approach is components or structural elements 806. It is recommended to conduct component level testing and modeling to understand material behavior, stress concentrations, and failure prediction. Typical structural elements in the primary load path are evaluated using three-point bending, tension, and compression tests. Component testing is used for design allowables and to calculate margin of safety. For example, the cross tubes and leg-spreader, e.g., as shown in FIG. 4, can be analyzed for critical bending load.

Modeling can be performed for the seat track and seat fitting to the seat track (including stud, shear plunger), seat cushions, seatbelt and shackles, discrete energy absorbers, and critical seat components in the primary load path (e.g., leg, spreader). Again, the model simulation tests are compared against physical tests of the corresponding components.

Component model and physical testing correlation provide assurance of material definition and material model validation. In order to implement failure prediction plasticity model, Generalized Incremental Stress State Dependent Damage Model (GISSMO) or equivalent for a given material, a test-analysis program is used. Component evaluation establishes the design value (minimum material strength or structural load) to minimize the probability of structural failures due to material variability. These design values can be used for margin of safety calculations to account for geometric design and material variability.

The use of component physical testing and simulation is particularly important for non-metallic parts or parts which may fail during a full-scale test. It is by characterizing the behavior beyond the elastic region that any confidence in the model can be obtained. In an illustrative embodiment, component level test-analysis correlation error is 8% or less.

After the individual components are modeled and evaluated against physical testing, sub-systems 808 are modeled and tested. Sub-system level simulation modeling and physical testing is used to understand each sub-system's behavior such as material properties as well as behavior of joints and interfaces. Based on functionality and usage, seat structure is typically organized into a number of sub-systems including primary structure (lower structure: legs, cross-tubes, seat pans, spreaders, etc.), secondary structure (upper structure: seat back, seatback control mechanism, etc.), seat cushions (bottom and back cushions), restraint system (seatbelt and shackles, airbag), items of mass (tray table, footrest, armrest, IAT table etc.), and structure to be assessed for head impact.

Sub-assembly model simulations and physical tests can be used not only to calculate static strength, but also to facilitate understanding of the load redistribution within the components. These tests are also useful for establishing and predicting permanent deformation of structure. In an illustrative embodiment, the sub-system level test-analysis correlation error is 8% or less.

After material, component, and subsystem validation, the complete seat system model 810 is compared to a dynamic test of the same test condition and similar installation specifics as the intended use of the model to show that the model reproduces the same behavior as the physical seat. A sled pulse from the physical test can be used in the model.

Channels that are critical to system performance can be identified and acceptable error limits specified. The computer model is considered validated if acceptable agreement between analysis and test data can be shown for those parameters critical to the application of the model.

In the building block approach shown in FIG. 8, each level of modeling and evaluation against physical testing ensures that model uncertainty and errors do not propagate to higher levels level of modeling.

Figure 9:
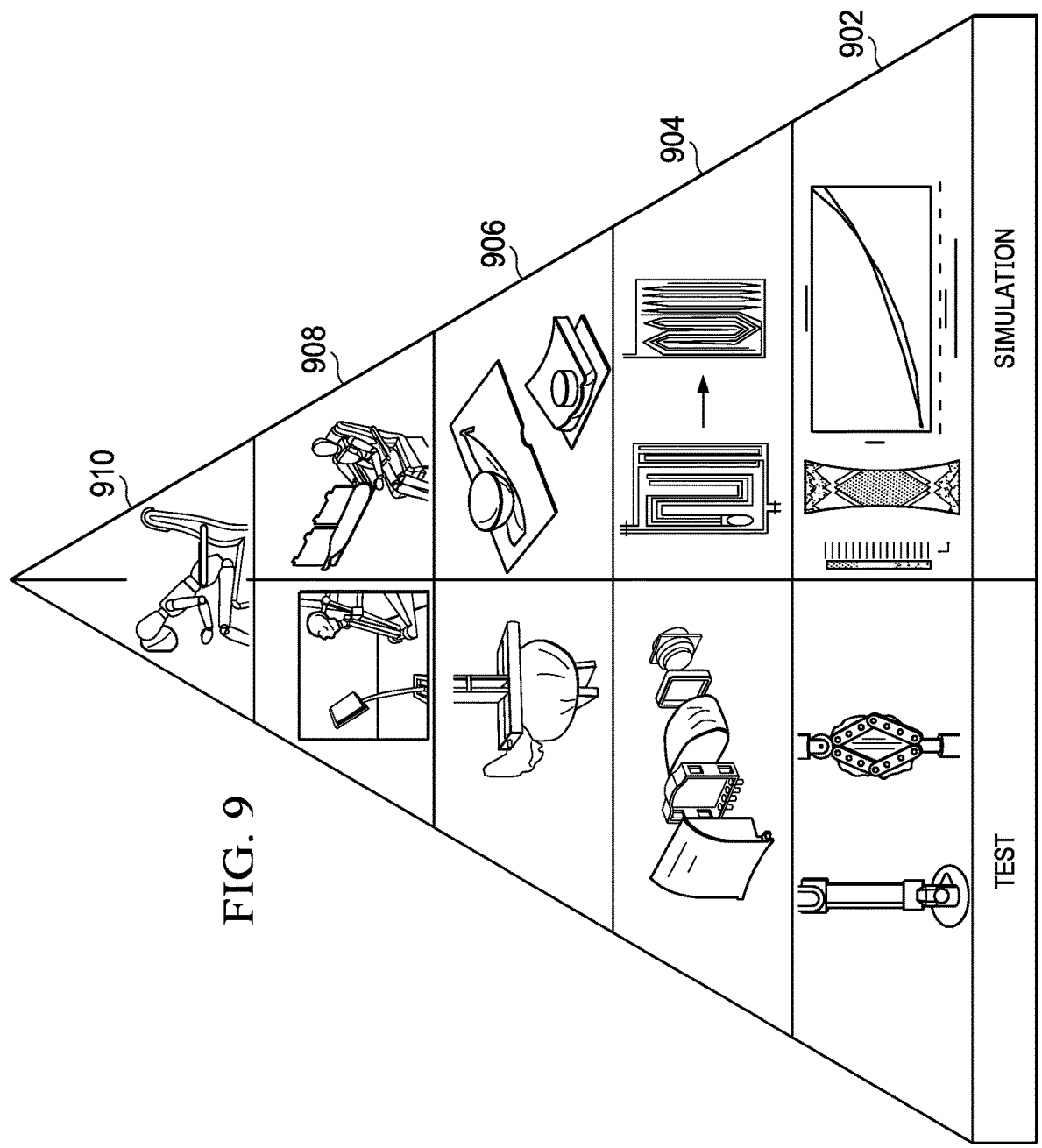
FIG. 9 illustrates a building block approach to building a simulation model of an airbag in accordance with an illustrative embodiment.

FIG. 9 illustrates a building block approach to building a finite element model of an airbag in accordance with an illustrative embodiment. FIG. 9 is an example of building a finite element model such as airbag model 126 in FIG. 1.

The building block approach illustrated in FIG. 9 follows a similar approach to that of FIG. 8. At each level, a feature of the deployable airbag is modeled and simulated under test conditions, and the simulation is evaluated against counterpart physical tests to assure fidelity of the model.

As with the seat modeling, the process of building the airbag model begins with simulating material properties and evaluating model predictions against material characterization coupon testing 902.

At the next level in the building block process, the folding/packaging of the airbag is modeled and evaluated against physical tests 904. Next the individual components of the airbag are modeled and compared against physical counterpart testing 906.

Sub-systems are then modeled and evaluated against physical tests 908. A key subsystem for an airbag is the inflator, which is modeled with respect to temperature and flow over time. The inflator is treated as a subsystem, which provides parameters that are used as critical inputs to the model. The bag itself can be considered a sub-system, or maybe a component, as fabric properties will affect the overall performance in terms of qualities such as, e.g., friction, stretch, and venting.

After material, component, and subsystem validation, the complete airbag model 910 can be modeled and compared to a physical test of airbag to show that the model reproduces the same behavior as the physical airbag. The full system includes the bag and inflator, which will alter the pressure depending on the volume of the bag and inflation pattern.

FIG. 10 illustrates an example assessment matrix for critical seat dynamic simulation in accordance with an illustrative embodiment. Matrix 1000 is a possible example of assessment matrix 144 in FIG. 1. Assessment matrix 1000 is one possible example. It is expected that the engineer will create a test article selection criteria matrix for a seat family and identify the critical seats for testing. The selection is based on the intended use of the model and on primary and secondary channel requirements. The test article should be selected based on critical responses in the primary load path and primary channel measurements (floor loads, seat belt loads, lumbar loads, stresses and plastic strains).

Figure 11:
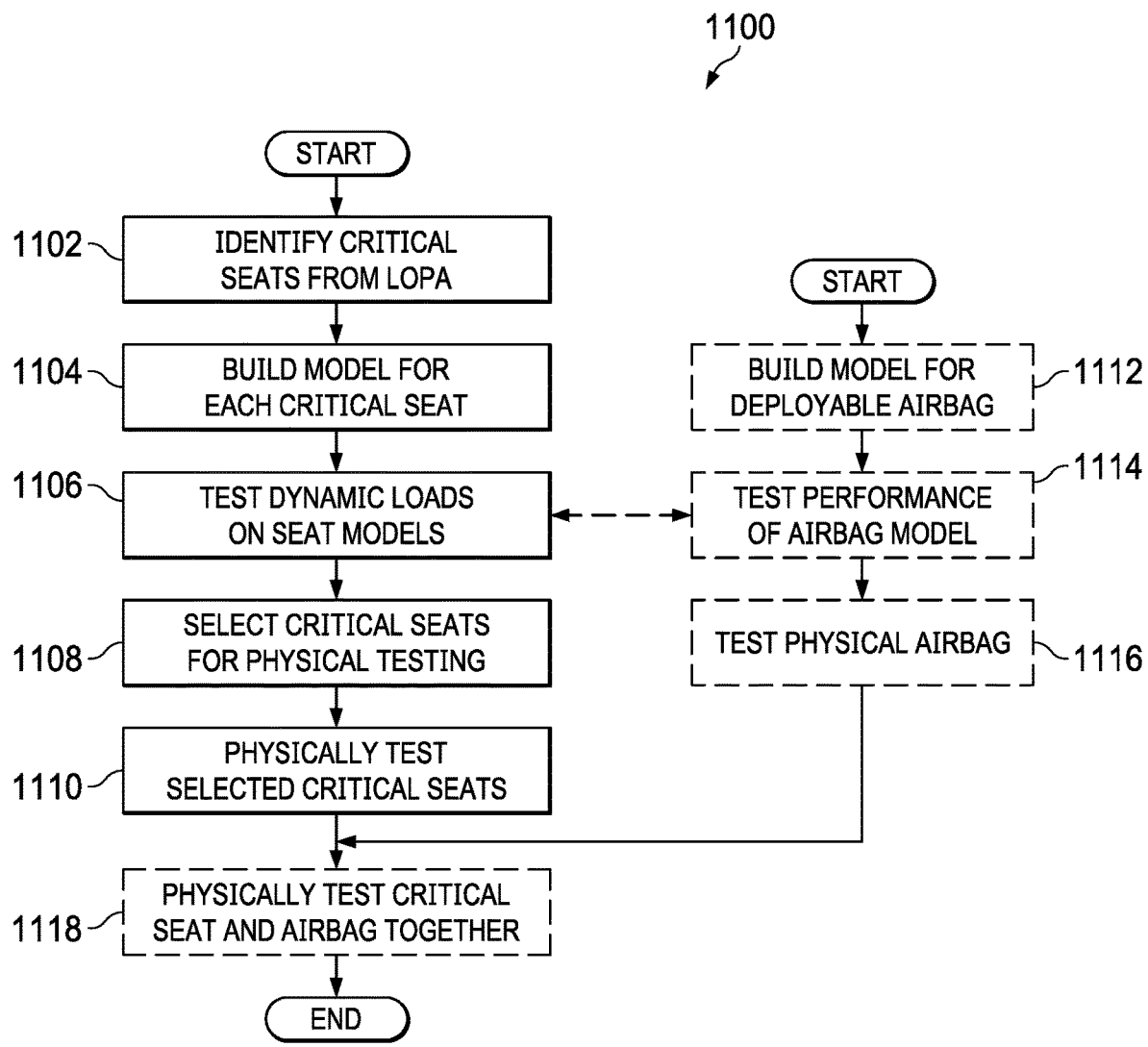
FIG. 11 depicts a flowchart for a process of simulating aircraft seats and deployable airbags in accordance with an illustrative embodiment.

FIG. 11 depicts a flowchart for a process of simulating aircraft seats and deployable airbags in accordance with an illustrative embodiment. Process 1100 is an example of how the process shown in FIGS. 3, 8, and 9 might be implemented and can be performed using computer system 100 in FIG. 1.

Process 1100 begins by identifying a number of critical seats for evaluation testing from an aircraft LOPA, e.g., as shown in FIG. 3 (step 1102). A simulation model is then built for each identified critical seat following a building block approach, e.g., as shown in FIG. 8 (step 1104).

Using simulation software for simulating specified load cases, process 1100 then tests a number of dynamic load cases on each respective model of the critical seats (step 1106). Dynamic simulations of the identified critical seats might comprise a number of test cases including, e.g., loads of 14 g down and 16 g forward with pitch and roll. Load testing simulation might also include, for example, energy balance, mass and moment of inertia, penetration check, v-ATD kinematic evaluation, and floor interface load check.

Critical seats are selected for physical testing from simulation model test results according to a specified criteria assessment matrix (step 1108). The criteria assessment matrix related the number of different test cases to a number of structural seat criteria and a number of occupant safety criteria. The structural seat criteria might comprise at least one of floor reaction loads, seatbelt attachment loads, structural deformation, critical strains, von Mises stresses, or track fitting interface shear stress. The occupant safety criteria might comprise at least one of head path, head displacement, velocity, and acceleration, head injury criteria (HIC), oblique neck injury criteria, lumbar forces, pelvic acceleration or femur loads.

After critical seats are selected for physical testing from among the simulation models, the counterpart physical seats represented by the models are physically tested (step 1110).

Optionally, for certain seats within the LOPA, process 1100 might also simulate and evaluate deployable airbags. For example, the airbag might be deployable from a bulkhead/partition in front of an identified critical seat in the LOPA, as shown in FIGS. 5-7.

Process 1100 builds a simulation model of a deployable airbag following a building block approach, e.g., as shown in FIG. 9 (step 1112). Process 1100 then simulates deployment and performance of the airbag model (step 1114). This simulation might comprise, for example, timing/time to firing, volume and shape, fold pattern, deployment path, venting and stiffness, and tether to control airbag shape. Optionally, if the airbag corresponds to a critical seat in the LOPA, the performance of the airbag model in step 1114 might be conduction in conjunction with simulation of loads on corresponding critical seat in step 1106.

The physical airbag can then be tested (step 1116). Predictions of the airbag model are evaluated by comparing them to physical test results of a counterpart the airbag. If the airbag in question corresponds with a critical seat that has been selected for physical testing, the counterpart physical airbag can be physically tested in conjunction with the physical seat (step 1118).

Figure 12:
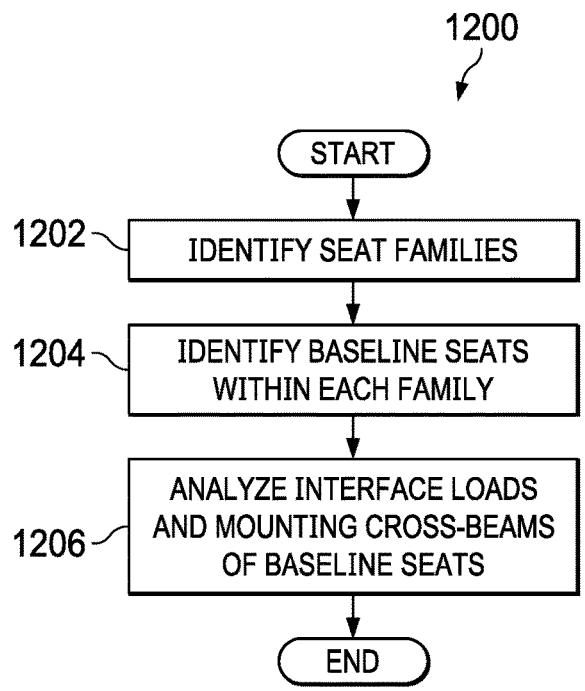
FIG. 12 depicts a flowchart for a process of identifying critical seats in accordance with an illustrative embodiment.

FIG. 12 depicts a flowchart for a process of identifying critical seats in accordance with an illustrative embodiment.

Process 1200 is a more detailed description of step 1102 in FIG. 11 and begins by identifying a number of seat families with the LOPA (step 1202). Seats within a seat family comprise common or equivalent components in a primary load path.

Process 1200 then identifies a number of baseline seats within each family (step 1204). Each baseline seat comprises a unique configuration and serves as a representative of that configuration with the family. As part of this process, symmetric/less critical seats might be eliminated from the list. For example, if two seats are identical except for being on the left and on the right side of the aircraft, they are symmetrical, and one can be eliminated from the list. Seats with each family can be grouped by number of legs and might be further sub-grouped by lateral leg spacing and by seat leg pitch.

Process 1200 then analyzes interface loads and mounting cross-beams (e.g., cross-beams 402) of the baseline seats and identifies as critical seats those seats having weights above a first specified threshold and cross-beams with bending attributes above a second specified threshold (step 1206). Analyzing interface loads and mounting cross-beams of the baseline seats might comprise analyzing forward loading and down loading conditions for different occupancy conditions including fully occupied, partially occupied, and unoccupied. For example, to simulate partially occupied conditions in the case of a three-passenger seat arrangement, one v-ATD might be simulated in the center with the outboard seats empty or two v-ATDs in each of the outboard positions with the center empty. Analyzing interface loads and mounting cross-beams of the baseline seats might also comprise removing from consideration non-critical parts with static loads below a specified threshold. The typical weight of an ATD might be approximately 170 pounds (77.3 kg), which can be simulated by a V-ATD.

Figure 13:
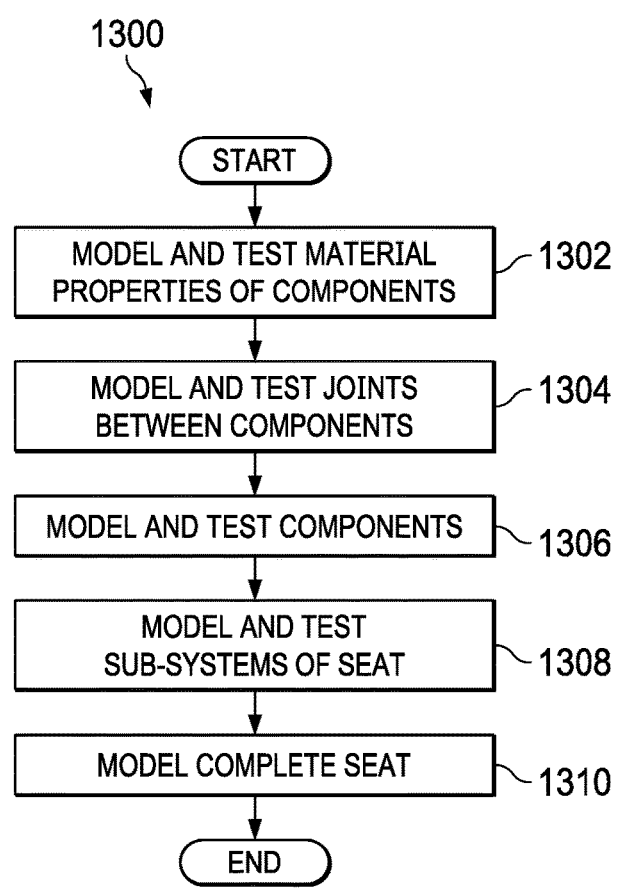
FIG. 13 depicts a flowchart for a building block process of building simulation models for critical seats in accordance with an illustrative embodiment.

FIG. 13 depicts a flowchart for a process of building finite elements models for critical seats in accordance with an illustrative embodiment. Process 1300 is a more detailed description of step 1104 in FIG. 11 and is an example of the process shown in FIG. 8. Process 1300 begins by modeling and testing a number of materials comprising seat components (step 1302). Predictions of the material models are evaluated by comparing them to physical test results of counterpart materials. The properties modeled and tested might comprise at least one of Young's modulus, Poisson's ratio, yield strength, ultimate strength, shear, bearing, elongation, displacement, density.

Process 1300 next models and tests the structural joints/bonds between the components comprising the seat (step 1304). Predictions of the joints models are evaluated by comparing them to physical test results of counterpart joints.

Process 1300 models and tests each component comprising the seat, including properties of materials comprising each component (step 1306). The components modeled and validated might include the seat track, the seat fitting to the seat track including stud and shear plunger, bottom cushions, back cushions, seatbelt, shackles, discrete energy absorbers, and seat components in a primary load path. Predictions of the component models are evaluated by comparing them to physical test results of counterpart components.

After the individual seat components are modeled and tested, a number of sub-systems of the seat are modeled and tested (step 1308). Each sub-system comprises a portion of the components comprising the seat, including joints between components. Examples of seat sub-systems include the lower structure including legs, cross-tubes, seat pans, and spreaders, the upper structure including seat back and seatback control mechanism, seat cushions including bottom and back cushions, the restraint system including seatbelt and shackles, and items of mass including tray table and footrest. Predictions of the sub-system models are evaluated by comparing them to physical test results of counterpart sub-systems.

Process 1300 then models the complete seat comprising all sub-systems (step 1310). The model of the complete seat is then ready for step 1106 in FIG. 11.

Figure 14:
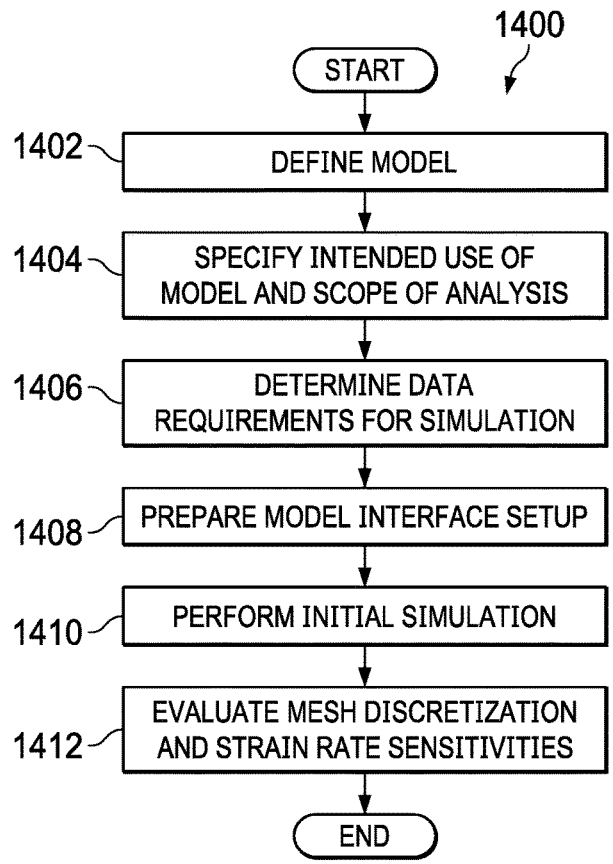
FIG. 14 depicts a flowchart for a process of simulating loads on critical seats in accordance with an illustrative embodiment.

FIG. 14 depicts a flowchart for a process of simulating loads on critical seats in accordance with an illustrative embodiment. Process 1400 is a more detailed description of step 1106 in FIG. 11. Process 1400 begins by defining the model to be analyzed (step 1402) and specifying an intended use of the model and a scope of analysis (step 1404).

Process 1400 then determines a number of data requirements for the simulation (step 1406).

A model interface setup is prepared that might comprise integration of the model, a v-ATD, seat track, and floor deformation fixtures (step 1408). An initial simulation is then performed to ensure total mass, connectivity, material properties, and solution controls are properly defined (step 1410).

From this initial simulation, process 1400 evaluates mesh discretization and strain rate sensitivities to ensure the model is defined properly before completing the full dynamic simulation (step 1412).

Figure 15:
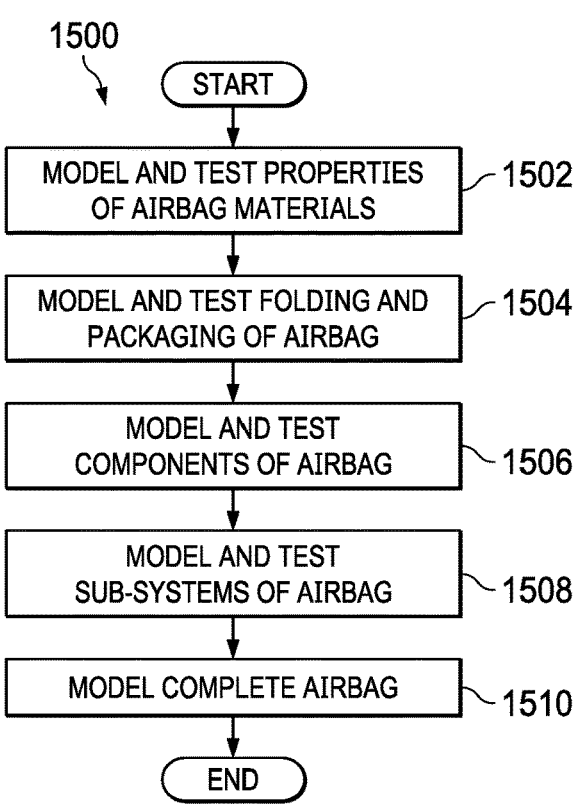
FIG. 15 depicts a flowchart for a building block process of building a simulation model for a deployable airbag in accordance with an illustrative embodiment.

FIG. 15 depicts a flowchart for a building block process of building a simulation model for a deployable airbag in accordance with an illustrative embodiment. Process 1500 is a more detailed description of step 1112 in FIG. 11 and is an example of the process shown in FIG. 9. The finite element model of the deployable airbag is built according to a number of criteria including, for example, regulatory requirements, occupant restraint protocol, occupant coverage, proximity of the airbag to features in the aircraft interior (e.g., bulkheads, class dividers, partition walls), timing/time to firing, accelerometers and locations, and inflator mass flow.

Similar to the seat model construction, process 1500 begins with modeling and testing a number of properties of the materials comprising the deployable airbag (step 1502). Predictions of the material models are evaluated by comparing them to physical test results of counterpart materials.

Process 1500 then models and tests the folding and packaging of the deployable airbag, which will influence how it deploys during simulation (step 1504). Predictions of the folding and packaging model are evaluated by comparing them to physical test results of counterpart folding and packaging.

Process 1500 models and tests each component comprising the deployable airbag, including properties of materials comprising each component (step 1506). Predictions of the component models are evaluated by comparing them to physical test results of counterpart components.

Process 1500 then models and tests a number of sub-systems of the deployable, wherein each sub-system comprises a portion of the components comprising the deployable airbag (step 1108). Predictions of the airbag sub-system models are evaluated by comparing them to physical test results of counterpart subsystems.

Finally, process 1500 models the complete deployable airbag, wherein the model comprises all sub-systems and components of the airbag (step 1510). The model of the complete airbag is then ready for step 1114 in FIG. 11.

Figure 16:
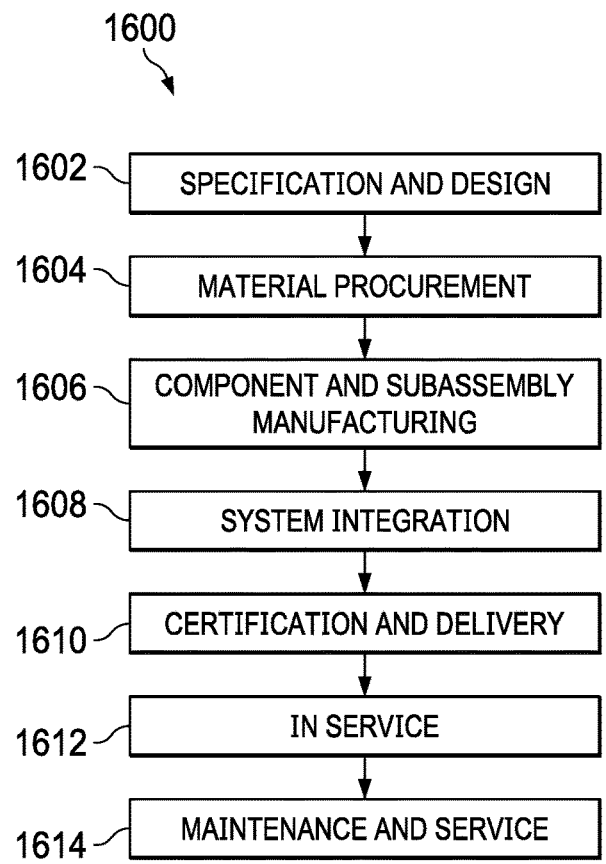
FIG. 16 is an illustration of an aircraft manufacturing and service method in a form of a block diagram in accordance with an illustrative embodiment.
Figure 17:
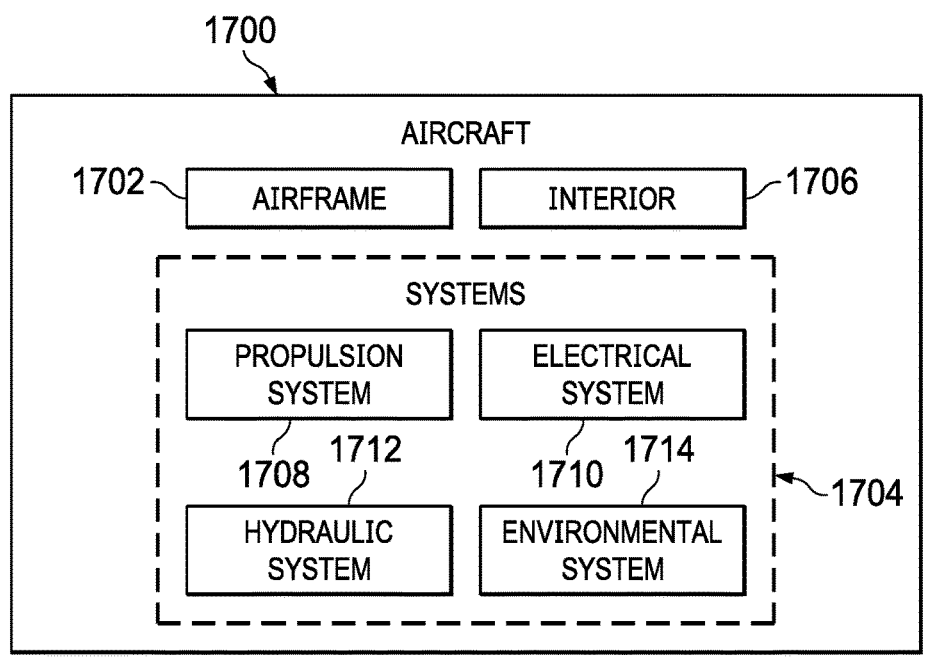
FIG. 17 is an illustration of an aircraft in a form of a block diagram in which an illustrative embodiment may be implemented.

Illustrative embodiments of the present disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in accordance with an illustrative embodiment. During preproduction, aircraft manufacturing and service method 1600 may include specification and design 1602 of aircraft 1700 in FIG. 17 and material procurement 1604.

During production, component and subassembly manufacturing 1606 and system integration 1608 of aircraft 1700 takes place. Thereafter, aircraft 1700 may go through evaluation and delivery 1610 in order to be placed in service 1612. While in service 1612 by a customer, aircraft 1700 is scheduled for routine maintenance and service 1614, which may include modification, reconfiguration, refurbishment, or other maintenance and service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in which an illustrative embodiment may be implemented. In this example, aircraft 1700 is produced by aircraft manufacturing and service method 1600 of FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600. One or more illustrative embodiments may be manufactured or used during at least one of component and subassembly manufacturing 1606, system integration 1608, in service 1612, or maintenance and service 1614 of FIG. 16.

Figure 18:
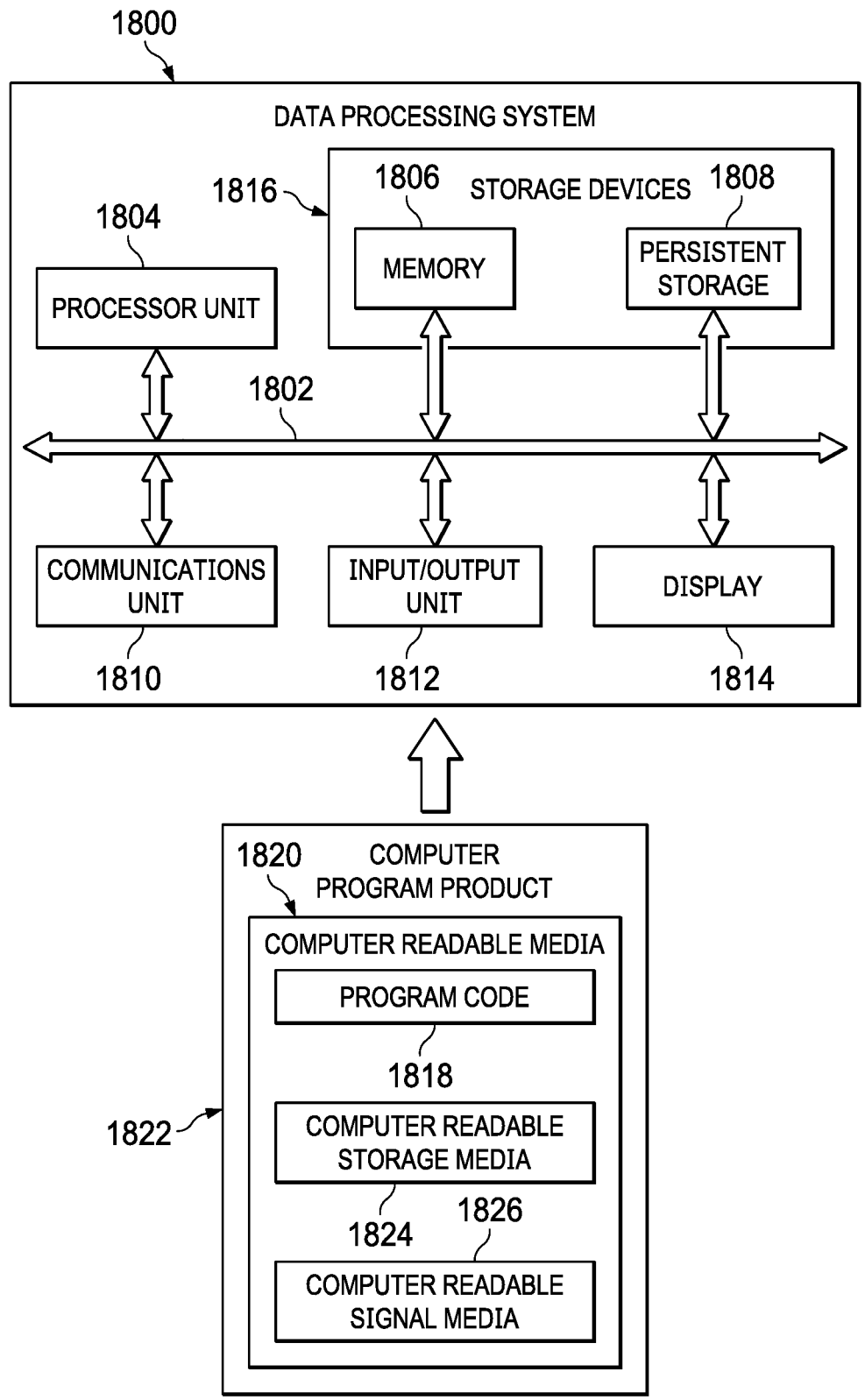
FIG. 18 depicts a block diagram of a data processing system in accordance with an illustrative embodiment.

Turning now to FIG. 18, an illustration of a block diagram of a data processing system is depicted in accordance with an illustrative embodiment. Data processing system might be an example of computer system 100 in FIG. 1. Data processing system 1800 might be used to implement one or more computers for carry out the process steps shown in FIGS. 11-15. In this illustrative example, data processing system 1800 includes communications framework 1802, which provides communications between processor unit 1804, memory 1806, persistent storage 1808, communications unit 1810, input/output unit 1812, and display 1814. In this example, communications framework 1802 may take the form of a bus system.

Processor unit 1804 serves to execute instructions for software that may be loaded into memory 1806. Processor unit 1804 may be a number of processors, a multi-processor core, or some other type of processor, depending on the particular implementation. In an embodiment, processor unit 1804 comprises one or more conventional general purpose central processing units (CPUs). In an alternate embodiment, processor unit 1804 comprises a number of graphical processing units (CPUs).

Memory 1806 and persistent storage 1808 are examples of storage devices 1816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1816 may also be referred to as computer-readable storage devices in these illustrative examples. Memory 1806, in these examples, may be, for example, a random access memory or any other suitable volatile or non-volatile storage device. Persistent storage 1808 may take various forms, depending on the particular implementation.

For example, persistent storage 1808 may contain one or more components or devices. For example, persistent storage 1808 may be a hard drive, a flash memory, a rewritable optical disk, a rewritable magnetic tape, or some combination of the above. The media used by persistent storage 1808 also may be removable. For example, a removable hard drive may be used for persistent storage 1808. Communications unit 1810, in these illustrative examples, provides for communications with other data processing systems or devices. In these illustrative examples, communications unit 1810 is a network interface card.

Input/output unit 1812 allows for input and output of data with other devices that may be connected to data processing system 1800. For example, input/output unit 1812 may provide a connection for user input through at least one of a keyboard, a mouse, or some other suitable input device. Further, input/output unit 1812 may send output to a printer. Display 1814 provides a mechanism to display information to a user.

Instructions for at least one of the operating system, applications, or programs may be located in storage devices 1816, which are in communication with processor unit 1804 through communications framework 1802. The processes of the different embodiments may be performed by processor unit 1804 using computer-implemented instructions, which may be located in a memory, such as memory 1806.

These instructions are referred to as program code, computer-usable program code, or computer-readable program code that may be read and executed by a processor in processor unit 1804. The program code in the different embodiments may be embodied on different physical or computer-readable storage media, such as memory 1806 or persistent storage 1808.

Program code 1818 is located in a functional form on computer-readable media 1820 that is selectively removable and may be loaded onto or transferred to data processing system 1800 for execution by processor unit 1804. Program code 1818 and computer-readable media 1820 form computer program product 1822 in these illustrative examples. In one example, computer-readable media 1820 may be computer-readable storage media 1824 or computer-readable signal media 1826.

In these illustrative examples, computer-readable storage media 1824 is a physical or tangible storage device used to store program code 1818 rather than a medium that propagates or transmits program code 1818. Alternatively, program code 1818 may be transferred to data processing system 1800 using computer-readable signal media 1826.

Computer-readable signal media 1826 may be, for example, a propagated data signal containing program code 1818. For example, computer-readable signal media 1826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

Further, as used herein, "computer-readable media 1820" can be singular or plural. For example, program code 1818 can be located in computer-readable media 1820 in the form of a single storage device or system. In another example, program code 1818 can be located in computer-readable media 1820 that is distributed in multiple data processing systems. In other words, some instructions in program code 1818 can be located in one data processing system while other instructions in in program code 1818 can be located in one data processing system. For example, a portion of program code 1818 can be located in computer-readable media 1820 in a server computer while another portion of program code 1818 can be located in computer-readable media 1820 located in a set of client computers.

The different components illustrated for data processing system 1800 are not meant to provide architectural limitations to the manner in which different embodiments may be implemented. The different illustrative embodiments may be implemented in a data processing system including components in addition to or in place of those illustrated for data processing system 1800. Other components shown in FIG. 18 can be varied from the illustrative examples shown. The different embodiments may be implemented using any hardware device or system capable of running program code 1818.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of assessing performance of a seat, the method comprising:
   using one or more processors to perform the steps of:
   identifying a number of critical seats designated for testing from a layout of passenger accommodation;
   building a computer simulation model, following a building block approach, for each identified critical seat;
   testing a number of loads on each simulation model; and
   selecting critical seats for physical testing from simulation model test results according to a specified criteria assessment matrix,
   wherein identifying critical seats further comprises:
   identifying a number of seat families, wherein seats within a seat family comprise common or equivalent components in a primary load path;
   identifying a number of baseline seats within each family, wherein each baseline seat comprises a unique configuration; and
   analyzing interface loads and mounting cross-beams of the baseline seats to identify critical seats and cross-beams, wherein critical seats have weights above a first specified threshold and cross-beams have bending attributes above a second specified threshold.

2. The method of claim 1, further comprising:
   building a computer simulation model of a deployable airbag following a second building block approach;
   testing performance of the airbag simulation model during a simulated deployment; and
   evaluating airbag simulation model test results against physical test results of a counterpart airbag.

3. The method of claim 2, wherein the airbag is deployable from a bulkhead in front of an identified critical seat in the layout of passenger accommodation.

4. The method of claim 2, wherein testing deployment and performance of the airbag model comprises at least one of:
   time to firing;
   volume and shape;
   fold pattern;
   deployment path;
   venting and stiffness; or
   tether to control airbag shape.

5. The method of claim 2, wherein the model of the deployable airbag is built according to a number of criteria including at least one of:
   regulatory requirements;
   occupant restraint protocol;

occupant coverage;
proximity of the airbag to a feature in an aircraft interior;
time to firing;
accelerometers and locations; or
inflator mass flow.

6. The method of claim 1, further comprising:
grouping seats within each family by number of legs;
sub-grouping seats within each family group by lateral leg spacing; and
sub-grouping seats within each family group by seat leg pitch.

7. The method of claim 1, wherein analyzing interface loads and mounting cross-beams of the baseline seats comprises analyzing load forward and down conditions for different occupancy conditions including fully occupied, partially occupied, and unoccupied.

8. The method of claim 1, wherein analyzing interface loads and mounting cross-beams of the baseline seats comprises removing from consideration non-critical parts with static loads below a specified threshold.

9. The method of claim 1, wherein testing loads on each simulation model includes loads of:
14 g down; and
16 g forward.

10. The method of claim 1, wherein the criteria assessment matrix relates a number of test cases to a number of structural seat criteria and a number of occupant safety criteria.

11. The method of claim 10, wherein the structural seat criteria comprise at least one of:
floor reaction loads;
seatbelt attachment loads;
structural deformation;
critical strains;
von Mises stresses; or
track fitting interface shear stress.

12. The method of claim 10, wherein the occupant safety criteria comprise at least one of:
head path;
head displacement, velocity, and acceleration,
head injury criteria;
oblique neck injury criteria;
lumbar forces;
pelvic acceleration; or
femur loads.

13. The method of claim 1, wherein building the computer simulation model for each identified critical seat further comprises:
modeling a number of materials comprising the seat;
evaluating material model predictions against physical test results of counterpart materials;
modeling joints between a number of components comprising the seat;
evaluating joint model predictions against physical test results of counterpart joints;
modeling each component comprising the seat, including properties of materials comprising each component;
evaluating component model predictions against physical test results of counterpart components;
modeling a number of sub-systems of the seat, wherein each sub-system comprises a portion of the components comprising the seat, including joints between components;
evaluating sub-system model predictions against physical test results of counterpart sub-systems; and
modeling the seat.

14. The method of claim 13, wherein the properties of materials comprising seat components comprise at least one of:
Young's modulus;
Poisson's ratio yield strength;
ultimate strength;
shear;
bearing;
elongation;
displacement; or
density.

15. The method of claim 13, wherein modeling is performed for one or more of the following components:
seat track;
seat fitting to the seat track, including stud and shear plunger;
bottom cushions;
back cushions;
seatbelt;
shackles;
discrete energy absorbers; or
seat components in a primary load path.

16. The method of claim 13, wherein modeling is performed for one or more of the following sub-systems:
lower structure including legs, cross-tubes, seat pans, and spreaders;
upper structure including seat back and seatback control mechanism;
seat cushions including bottom and back cushions;
restraint system including seatbelt and shackles; or
items of mass including tray table and footrest.

17. The method of claim 1, wherein testing loads on each simulation model further comprises:
defining a model to be analyzed;
specifying an intended use of the model and a scope of analysis;
determining a number of data requirements for the simulation; and
preparing a model interface setup comprising integration of the seat model, a virtual anthropomorphic test device, seat track, and floor deformation fixtures.

18. The method of claim 1, further comprising evaluating simulation model test results for:
energy balance;
mass and moment of inertia;
penetration check;
virtual anthropomorphic test device kinematic evaluation; and
floor interface load check.

19. The method of claim 1, further comprising:
comparing simulation model test results of each selected critical seat to physical test results of a counterpart seat; and
determining if the seat models reproduce the same behavior as equivalent physical seats within specified error limits.

20. The method of claim 19, further comprising:
evaluating a virtual anthropomorphic test device;
evaluating seat structural response; and
evaluating an assembly of the virtual anthropomorphic test device and seat.

21. A system for assessing performance of a seat, the system comprising:
a storage device configured to store program instructions; and one or more processors operably connected to the storage device and configured to execute the program instructions to cause the system to:
- identify a number of critical seats designated for testing from a layout of passenger accommodation;
- build a computer simulation model, following a building block approach, for each identified critical seat;
- test a number of loads on each simulation model; and
- select critical seats for physical testing from simulation model test results according to a specified criteria assessment matrix, wherein identifying critical seats further comprises:
- identifying a number of seat families, wherein seats within a seat family comprise common or equivalent components in a primary load path;
- identifying a number of baseline seats within each family, wherein each baseline seat comprises a unique configuration; and
- analyzing interface loads and mounting cross-beams of the baseline seats to identify critical seats and cross-beams, wherein critical seats have weights above a first specified threshold and cross-beams have bending attributes above a second specified threshold.

22. The system of claim 21, further comprising:
building a computer simulation model of a deployable airbag following a second building block approach;
testing performance of the airbag simulation model during a simulated deployment; and
evaluating airbag simulation model test results against physical test results of a counterpart airbag.

23. The system of claim 22, wherein the airbag is deployable from a bulkhead in front of an identified critical seat in the layout of passenger accommodation.

24. The system of claim 22, wherein testing deployment and performance of the airbag model comprises at least one of:
time to firing;
volume and shape;
fold pattern;
deployment path;
venting and stiffness; or
tether to control airbag shape.

25. The system of claim 22, wherein the model of the deployable airbag is built according to a number of criteria including at least one of:
regulatory requirements;
occupant restraint protocol;
occupant coverage;
proximity of the airbag to a feature in an aircraft interior;
time to firing;
accelerometers and locations; or
inflator mass flow.

26. The system of claim 21, further comprising:
grouping seats within each family by number of legs;
sub-grouping seats within each family group by lateral leg spacing; and
sub-grouping seats within each family group by seat leg pitch.

27. The system of claim 21, wherein analyzing interface loads and mounting cross-beams of the baseline seats comprises analyzing load forward and down conditions for different occupancy conditions including fully occupied, partially occupied, and unoccupied.

28. The system of claim 21, wherein analyzing interface loads and mounting cross-beams of the baseline seats comprises removing from consideration non-critical parts with static loads below a specified threshold.

29. The system of claim 21, wherein testing loads on each simulation model includes loads of:
14 g down; and
16 g forward.

30. The system of claim 21, wherein the criteria assessment matrix relates a number of test cases to a number of structural seat criteria and a number of occupant safety criteria.

31. The system of claim 30, wherein the structural seat criteria comprise at least one of:
floor reaction loads;
seatbelt attachment loads;
structural deformation;
critical strains;
von Mises stresses; or
track fitting interface shear stress.

32. The system of claim 30, wherein the occupant safety criteria comprise at least one of:
head path;
head displacement, velocity, and acceleration,
head injury criteria;
oblique neck injury criteria;
lumbar forces;
pelvic acceleration; or
femur loads.

33. The system of claim 21, wherein building the computer simulation model for each identified critical seat further comprises:
modeling a number of materials comprising the seat;
evaluating material model predictions against physical test results of counterpart materials;
modeling joints between a number of components comprising the seat;
evaluating joint model predictions against physical test results of counterpart joints;
modeling each component comprising the seat, including properties of materials comprising each component;
evaluating component model predictions against physical test results of counterpart components;
modeling a number of sub-systems of the seat, wherein each sub-system comprises a portion of the components comprising the seat, including joints between components;
evaluating sub-system model predictions against physical test results of counterpart sub-systems; and
modeling the seat.

34. The system of claim 33, wherein the properties of materials comprising seat components comprise at least one of:
Young's modulus;
Poisson's ratio
yield strength;
ultimate strength;
shear;
bearing;
elongation;
displacement; or
density.

35. The system of claim 33, wherein modeling is performed for one or more of the following components:
seat track;
seat fitting to the seat track, including stud and shear plunger;
bottom cushions;
back cushions;
seatbelt;
shackles;

discrete energy absorbers; or seat components in a primary load path.

36. The system of claim 33, wherein modeling is performed for one or more of the following sub-systems:

lower structure including legs, cross-tubes, seat pans, and spreaders;

upper structure including seat back and seatback control mechanism;

seat cushions including bottom and back cushions;

restraint system including seatbelt and shackles; or items of mass including tray table and footrest.

37. The system of claim 21, wherein testing loads on each simulation model further comprises:

defining a finite element model to be analyzed;

specifying an intended use of the model and a scope of analysis;

determining a number of data requirements for the simulation; and preparing a model interface setup comprising integration of the finite element model, a virtual anthropomorphic test device, seat track, and floor deformation fixtures.

38. The system of claim 21, further comprising evaluating simulation model test results for:

energy balance;

mass and moment of inertia;

penetration check;

virtual anthropomorphic test device kinematic evaluation; and floor interface load check.

39. The system of claim 21, further comprising:

comparing simulation model test results of each selected critical seat to physical test results of a counterpart seat; and determining if the seat models reproduce the same behavior as equivalent physical seats within specified error limits.

40. The system of claim 39, further comprising:

evaluating a virtual anthropomorphic test device;

evaluating seat structural response; and evaluating an assembly of the virtual anthropomorphic test device and seat.

41. A computer program product for seat certification for aircraft under emergency landing dynamic loading conditions, the computer program product comprising:

a non-transitory computer readable storage media having program instructions embodied therewith, the program instructions executable by a number of processors to cause a number of processors to perform the steps of:

identifying a number of critical seats designated for testing from a layout of passenger accommodation;

building a computer simulation model, following a building block approach, for each identified critical seat;

testing a number of loads on each simulation model; and selecting critical seats for physical testing from simulation model test results according to a specified criteria assessment matrix, wherein identifying critical seats further comprises:

identifying a number of seat families, wherein seats within a seat family comprise common or equivalent components in a primary load path;

identifying a number of baseline seats within each family, wherein each baseline seat comprises a unique configuration; and analyzing interface loads and mounting cross-beams of the baseline seats to identify critical seats and cross-beams, wherein critical seats have weights above a first specified threshold and cross-beams have bending attributes above a second specified threshold.

42. A computer-implemented method of assessing performance of a seat, the method comprising:

using one or more processors to perform the steps of:

identifying a number of critical seats designated for testing from a layout of passenger accommodation;

building a computer simulation model, following a building block approach, for each identified critical seat;

testing a number of loads on each simulation model;

selecting critical seats for physical testing from simulation model test results according to a specified criteria assessment matrix;

building a computer simulation model of a deployable airbag following a second building block approach;

testing performance of the airbag simulation model during a simulated deployment; and evaluating airbag simulation model test results against physical test results of a counterpart airbag, wherein building the simulation model of the deployable airbag comprises:

modeling a number of materials comprising the deployable airbag;

evaluating material model predictions against physical test results of counterpart materials;

modeling folding and packaging of the airbag;

evaluating folding and packaging model predictions against physical test results of counterpart folding and packaging;

modeling each component comprising the deployable airbag, including properties of materials comprising each component;

evaluating component model predictions against physical test results of counterpart components;

modeling a number of sub-systems of the deployable airbag, wherein each sub-system comprises a number of the components comprising the deployable airbag;

evaluating sub-system model predictions against physical test results of counterpart sub-systems; and modeling the deployable airbag.

43. A system for assessing performance of a seat, the system comprising:

a storage device configured to store program instructions; and one or more processors operably connected to the storage device and configured to execute the program instructions to cause the system to:

identify a number of critical seats designated for testing from a layout of passenger accommodation;

build a computer simulation model, following a building block approach, for each identified critical seat;

test a number of loads on each simulation model;

select critical seats for physical testing from simulation model test results according to a specified criteria assessment matrix;

building a computer simulation model of a deployable airbag following a second building block approach;

testing performance of the airbag simulation model during a simulated deployment; and evaluating airbag simulation model test results against physical test results of a counterpart airbag, wherein building the simulation model of the deployable airbag comprises:

modeling a number of materials comprising the deployable airbag;

evaluating material model predictions against physical test results of counterpart materials;

modeling folding and packaging of the airbag;

evaluating folding and packaging model predictions against physical test results of counterpart folding and packaging;

modeling each component comprising the deployable airbag, including properties of materials comprising each component;

evaluating component model predictions against physical test results of counterpart components;

modeling a number of sub-systems of the deployable airbag, wherein each sub-system comprises a number of the components comprising the deployable airbag;

evaluating sub-system model predictions against physical test results of counterpart sub-systems; and modeling the deployable airbag.

44. A computer program product for seat certification for aircraft under emergency landing dynamic loading conditions, the computer program product comprising:

a non-transitory computer readable storage media having program instructions embodied therewith, the program instructions executable by a number of processors to cause a number of processors to perform the steps of:

identifying a number of critical seats designated for testing from a layout of passenger accommodation;

building a computer simulation model, following a building block approach, for each identified critical seat;

testing a number of loads on each simulation model; and selecting critical seats for physical testing from simulation model test results according to a specified criteria assessment matrix;

building a computer simulation model of a deployable airbag following a second building block approach;

testing performance of the airbag simulation model during a simulated deployment; and evaluating airbag simulation model test results against physical test results of a counterpart airbag, wherein building the simulation model of the deployable airbag comprises:

modeling a number of materials comprising the deployable airbag;

evaluating material model predictions against physical test results of counterpart materials;

modeling folding and packaging of the airbag;

evaluating folding and packaging model predictions against physical test results of counterpart folding and packaging;

modeling each component comprising the deployable airbag, including properties of materials comprising each component;

evaluating component model predictions against physical test results of counterpart components;

modeling a number of sub-systems of the deployable airbag, wherein each sub-system comprises a number of the components comprising the deployable airbag;

evaluating sub-system model predictions against physical test results of counterpart sub-systems; and modeling the deployable airbag.

\* \* \* \* \*